UNITED STATES PATENT OFFICE.

MARCEL WEINBERG, OF BROOKLYN, NEW YORK.

COMPOSITION OF MATTER.

1,400,395. Specification of Letters Patent. Patented Dec. 13, 1921.

No Drawing. Application filed May 18, 1921. Serial No. 470,655.

*To all whom it may concern:*

Be it known that I, MARCEL WEINBERG, a citizen of Rumania, and a resident of the city of New York, borough of Brooklyn, in the county of Kings and State of New York, have invented a new and Improved Composition of Matter, of which the following is a full, clear, and exact description.

This invention relates to a composition of matter, and has particular reference to a composition of matter for use as a rust preventive.

An object of the invention is to provide an economically manufactured, simple and efficient composition in the form of a paste which can be used, when mixed with a suitable amount of water, preferably as an antirust solution for metallic surfaces, especially the cutting surfaces of razor blades.

Rust, according to prevalent theories, is due to the combined action of water, oxygen and an acid. If one of these three factors is missing, rusting does not take place. Allowance must be made, however, for the so-called spontaneous rusting, an action which takes place even though no acid is present but which really is due to contact between one metal and another or in which the iron or metal itself is very impure. This unusual condition of spontaneous rusting is eliminated in the case of shaving blades, for instance, or high grade cutlery, which is generally made of very pure steel.

What I wish to patent, however, is a composition of matter which is in the form of a constantly slightly alkaline medium so that the acid factor of the rusting process is eliminated. This composition also contains a reducing agent so that the oxygen factor is also eliminated. The necessary alkalinity is given to the composition by means of an alkaline salt which may, for instance, be sodium carbonate. The reducing property is given by means of formaldehyde. At the same time the consistency of the mixture is preferably made somewhat similar to a gelatinous solution, a fact which makes the circulation of oxygen from the exterior into the solution rather difficult. This consistency may be produced by means of a soap solution which, besides having the desired consistency, also serves as an alkaline medium and helps the functioning of the carbonate. I also purpose to add a clarifying substance to the solution, which ordinarily would be rather turbid. Such a clarifier may be glycerin.

In the preparation of this composition, I take 16 parts of ordinary soap and dissolve it in 35 parts of boiling water. Separately, I take 8 parts of sodium carbonate and dissolve it in 22 parts of water. Both these solutions are then mixed while warm (about 60° C.), and then 10 parts of glycerin is added. The glycerin tends to redissolve the precipitate which results from the mixing of the two solutions above mentioned. Five parts of a solution of 40 per cent. formaldehyde is then added, completing the formation of the composition. By cooling, this composition attains a pasty consistency. This paste is soluble, however, in warm water; and in order to use it, one part of paste is dissolved in six to seven parts of warm water.

The resulting composition is a very effective rust preventive for iron and steel on account of its slightly alkaline medium, its reducing properties and its impermeability to air, this impermeability being due to the gelatinous consistency.

A piece of iron or steel or other metal dipped into this substance remains almost indefinitely clean, rust being prevented from forming thereon. The paste or solution also has the property of acting as a sterilizer, due to the presence of formaldehyde. The liquid or paste can be kept in a closed jar practically indefinitely.

What I claim is:

1. A composition of matter for preventing the formation of rust, which comprises the following ingredients: a soap, an alkali, a clarifying medium, and a sterilizing agent.

2. A composition of matter for preventing the formation of rust, which comprises ordinary soap, an alkaline salt, a clarifying agent, and a sterilizer.

3. A composition of matter for preventing the formation of rust, which comprises ordinary soap, sodium carbonate, glycerin, and formaldehyde.

4. A composition of matter for preventing the formation of rust, which comprises sixteen parts of soap dissolved in thirty-five parts of water, mixed with eight parts of sodium carbonate previously dissolved in twenty-two parts of water, ten parts of glycerin, and five parts of a forty per cent. solution of formaldehyde.

5. A composition of matter for preventing the formation of rust, which comprises a soap ingredient having a gelatinous consistency, an alkaline salt, a clarifying agent, and a sterilizing agent.

MARCEL WEINBERG.